United States Patent
Kühl

[11] Patent Number: 6,053,508
[45] Date of Patent: Apr. 25, 2000

[54] DEVICE FOR THE CENTRIC AND/OR IMBALANCE-FREE HOLDING OF WORKPIECES OR TOOLS

[76] Inventor: Hans Kühl, Kornbergweg 12, 73207, Plochingen, Germany

[21] Appl. No.: 08/883,227

[22] Filed: Jun. 26, 1997

[30] Foreign Application Priority Data

Jun. 26, 1996 [DE] Germany ............... 196 25 553

[51] Int. Cl.⁷ ................................................ B23B 31/117
[52] U.S. Cl. ........................ 279/102; 279/96; 403/350; 408/143
[58] Field of Search ........................ 279/96, 102, 129; 403/350; 74/573 R; 408/143

[56] References Cited

U.S. PATENT DOCUMENTS

| | | | |
|---|---|---|---|
| 2,234,486 | 3/1941 | Craig | 403/350 |
| 2,284,847 | 6/1942 | Raymond | 403/350 |
| 2,454,771 | 11/1948 | Carr | 279/102 |
| 2,479,698 | 8/1949 | Paquin | 403/350 |
| 2,729,458 | 1/1956 | Sacrey | 403/350 |
| 5,407,295 | 4/1995 | Kuhl | 403/350 |
| 5,427,468 | 6/1995 | Mullenberg | 403/350 |

FOREIGN PATENT DOCUMENTS

| | | |
|---|---|---|
| 0532824A1 | 3/1993 | European Pat. Off. . |
| 907233 | 3/1954 | Germany . |
| 3205088A1 | 8/1983 | Germany . |

*Primary Examiner*—Steven C. Bishop
*Attorney, Agent, or Firm*—Evenson, McKeown, Edwards & Lenahan, PLLC

[57] ABSTRACT

In order to permit a fast, precisely centric fastening of rotating tools, such as drills or milling tools in clamping sleeves, of such clamping sleeves or of workpiece holding devices, such as clamping chucks 4 in spindles 1 of turning machines, respective holding surfaces 9/10, 23/24 are provided in the respective parts to be connected with one another with profiles 11, 12, 25, 26 which are coordinated with one another in pairs and which each have at least two wedges 13, 15. The wedges rise over imaginary cylindrical reference surfaces 14, 16 radially toward the outside and inside and each drop again steeply onto the reference surfaces and are offset in the circumferential direction by identical angles and have a joining gap in a joining position.

3 Claims, 2 Drawing Sheets

DEVICE FOR THE CENTRIC AND/OR IMBALANCE-FREE HOLDING OF WORKPIECES OR TOOLS

BACKGROUND AND SUMMARY OF THE INVENTION

This application claims the priority of German application 196 25 553.8 filed in Germany on Jun. 26, 1996, the disclosure of which is expressly incorporated by reference herein.

The invention relates to a device for the centric and/or imbalance-free holding of workpieces or tools on a spindle of a machine tool by means of centric holding surfaces.

For example, in turning machines having a spindle, tools are received in exchangeable clamping sleeves or workpieces to be machined are received in clamping chucks and these, in turn, are received in holding devices of the spindle on cylindrical holding or clamping surfaces which are centric with respect to the axis of rotation of the spindle. Also, in the case of a high-precision manufacturing, these holding or clamping surfaces have an unavoidable eccentricity with respect to their axis. When receiving a tool in a clamping sleeve or a workpiece in a clamping chuck and the clamping sleeve or the clamping chuck in the spindle, these eccentricities are added up depending on the respective accidental angular position of the parts in a mutually reinforcing or reducing manner.

In other cases, the mentioned parts also have unbalanced masses which, when being received in the spindle, also add up in a reinforcing or reducing manner and, particularly, in the case of high rotational speeds, lead to vibrations or machining faults.

It is an object of the invention to provide a simple possibility for rapidly inserting a tool in a clamping sleeve, a workpiece in a clamping chuck and a clamping sleeve or a clamping chuck in a spindle of a turning machine and removing it and holding it securely.

The invention achieves this object by providing an arrangement of the above-mentioned type wherein device holding surfaces are provided with profiles which are coordinated with one another in pairs and which each have at least two wedges which rise over imaginary cylindrical reference surfaces radially toward the outside or toward the inside and each again drop steeply back to the reference surfaces, are offset by the same angles in the circumferential direction and have a joining gap in a joining position.

Because of the joining gap and the wedges arranged around the circumference of the holding surfaces, the tool can be inserted in the clamping sleeve, the workpiece can be inserted in the clamping chuck and these can, in turn, be inserted in the spindle and by a rotating about a fraction of a rotation can be fastened by means of a frictional engagement.

Particularly when three wedges are arranged to be offset with respect to one another by the same angles, a very good centering effect can be obtained.

In particular, when the number of the wedges is increased to, for example, six, there is the advantage that, in the angularly offset starting positions corresponding to the number of wedges the parts are inserted into the respective assigned holding device and are connected with it in a frictionally engaged manner by rotating. In the case of a flat slope, a rotating in the frictional engagement by up to 30° is possible. In the case of, for example, six wedges on the circumference, six different positions are obtained for the fastening which each extend over up to 30°. When the angular positions of the eccentricities or unbalanced masses of two respective parts to be connected are known with respect to a respective starting position, the parts can be joined in such a mutual angular position and rotated into the frictional engagement that the eccentricities or unbalanced masses are largely diametrically opposite with respect to the axis of rotation of the spindle. As a result, it is achieved that the eccentricities or the unbalanced masses compensate one another as much as possible up to a remaining minimum.

The minimal number of wedges around the circumference of the holding surfaces is two—which ensures a secure holding and, particularly when the surfaces of the wedges according to the invention follow the course of a logarithmic spiral and are therefore disposed flatly against one another in all angular positions with respect to one another, offers a high centering precision in the respective holding device.

The flatter the slope of the wedges in the profile pairings, the larger the angle about which the parts in the frictional engagement can be rotated into a position of an optimal compensation of the eccentricities or of the unbalanced masses.

The width of the wedges is selected such that the required torque can be sensed and transmitted during the work of the tool or during the machining of the workpiece. The slope direction of the wedges is advantageously such that the frictional engagement has the tendency of being increased during the machining.

Furthermore, the wedge-shaped profiles have the advantage that they act as an overload protection particularly during the holding of a tool. Specifically, if the slope of the wedges and/or the length of the wedges is low in the circumferential direction, the wedges may jump over in the case of an extreme rise of the moment of resistance; that is, the highest elevations of the wedges of a profile pairing slide over one another. This limits the rise of the contacting moment and a break is avoided.

It is preferably provided in this case to displace a jumping-over of profile pairings between a tool and the clamping sleeve by correspondingly selecting the slopes in order to avoid damage to the holding device on the spindle.

An advantageous slope of the wedges depends, among other things, on the diameter of the profiling. When the diameters are small, the slopes are higher and are in the range of from 1:50 to 1:200. When the diameters are large, the slopes may be reduced to 1:500.

The figures of the drawing schematically show the embodiments of the invention on a turning machine and in the form of a clamping chuck, a clamping sleeve and a tool. It is understood that the invention can also be used on many other devices.

Other objects, advantages and novel features of the present invention will become apparent from the following detailed description of the invention when considered in conjunction with the accompanying drawings.

DETAILED DESCRIPTION OF THE INVENTION

Figure 1:
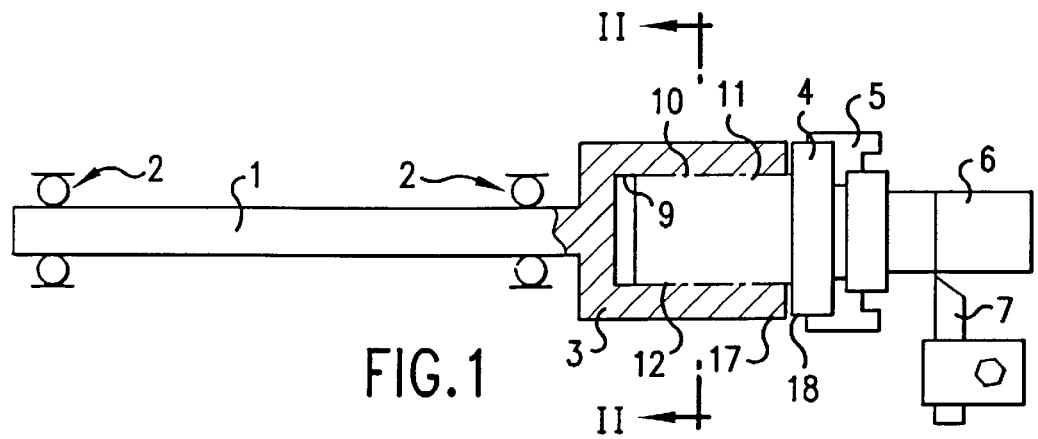
FIG. 1 is a longitudinal sectional view of a receiving device of a clamping chuck constructed according to a preferred embodiment of the invention.

As illustrated in FIG. 1, the spindle, for example, of a turning machine, is disposed in two roller bearings 2—their known drive not being shown for reasons of clarity. At the free end, the spindle 1 carries a pot-shaped holding device 3 for receiving a clamping chuck 4. The clamping chuck 4 is of a known construction, which is therefore not described in detail, and clamps a workpiece 6 by means of its jaws 5. The workpiece 6 selected as an example has a cylindrical form and, for example, is to be turned on its circumference by means of turning tool 7.

Figure 2:
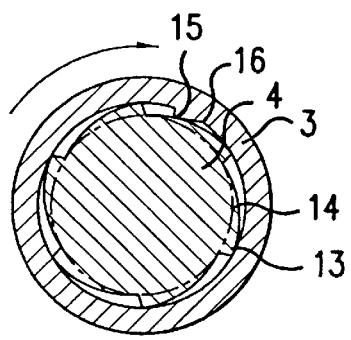
FIG. 2 is a cross-sectional view in the plane II—II of FIG. 1.

The cylindrical holding surface 9 of the holding device 3 and the also cylindrical holding surface 10 of the clamping chuck 4 are provided with profiles 11 and 12 whose construction is illustrated in FIG. 2. The profile 11 on the clamping chuck 4 is formed by wedges 13 which, over an imaginary, dash-dotted, cylindrical reference surface 14, rise with a slight slope of, for example, 1:100 which, for reasons of clarity is shown here to be very magnified, and which then steeply drop down again to this reference surface. Correspondingly, the wedges 15, which form the profile 12 on the holding surface 9 of the holding device 3, project over an imaginary cylindrical reference surface 16 with a slightly larger diameter than that of the reference surface 14 toward the inside. The illustrated example shows three wedges 13, 15 which each extend over 120°. The wedges 13, 15 or their surfaces therefore form mutually coordinated profiles 11 and 12 in the holding device 3 or on the clamping chuck 4. Except in the very magnified representation of FIG. 2, the profiles are indicated only in a dash-dotted manner in the other figures because the height of the wedges is so low that they would not be recognizable.

In a starting position in which the steep slopes of the wedges rest against one another, a gap exists between the surfaces of the wedges 13, 15 which is used as a joining play and which permits the introduction of the clamping chuck 4 into the holding device 3.

A once determined angular position of an eccentricity or of an imbalance of the holding device 3 of the spindle 1 is indicated, for example, on the edge of the holding device by means of a marking 17. Likewise, the angular position of a respective imbalance or eccentricity of the clamping chuck 4 to be determined is noted on the latter by means of a marking 18.

For inserting the clamping chuck 4 into the holding device 4, while utilizing the joining gap and observing the markings 17 and 18, the clamping chuck 4 is pushed into the holding device 3 and, in the representation of FIG. 2, is rotated counterclockwise until, when the clamping chuck is rotated into the frictional engagement with the holding device 3, the marking 18 is approximately opposite the marking 17 on the receiving device 3—depending on the arrangement of the markings directly or with respect to the axis of rotation 19 of the spindle 1. In this case, the surfaces of the wedges 13 on the clamping chuck 4 and of the wedges 15 in the holding device 3 will come to rest against one another and slide on one another in the frictional engagement while the contact pressure increases. In this case, the direction of the slope of the wedges 13, 15 is such that this frictional engagement is increased when the workpiece spindle 1 is rotated in the working rotating direction indicated by means of an arrow in FIG. 2.

For removing the clamping chuck 4 from the holding device 3 of the spindle 1, the clamping chuck and the spindle are rotated in a direction opposite to that during the insertion, whereby the frictional engagement is released and the clamping chuck can be removed. For the rotation into and out of the frictional engagement, the clamping chuck 4 can be provided with a key face which is not shown and to which a suitable tool can be applied.

Figure 3:
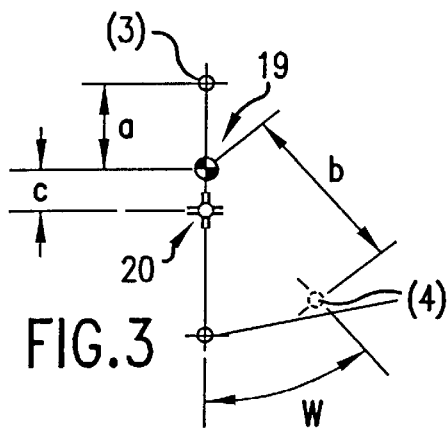
FIG. 3 is a schematic view illustrating the principle of the compensating of eccentricities or unbalanced masses according to the invention.

FIG. 3 illustrates the principle of the endeavored compensation of eccentricities and unbalanced masses: Let it be assumed that the holding device 3 has an eccentricity "a" or an unbalanced mass with the moment (size times distance from the axis of rotation 19 of the spindle) of "a" in the indicated direction. The clamping chuck 4 has an eccentricity "b" or an unbalanced mass with the moment "b". The clamping chuck 4 has the holding device 3 and rotated about the angle W in the frictional engagement such that the direction of its eccentricity or unbalanced mass is as precisely as possible situated opposite that of the holding device with respect to the axis of rotation 19. As a result, the eccentricities or unbalanced masses "a" and "b" compensate one another with the exception of the residual amount "c" of a resulting eccentricity or unbalanced mass 20.

Figure 6:
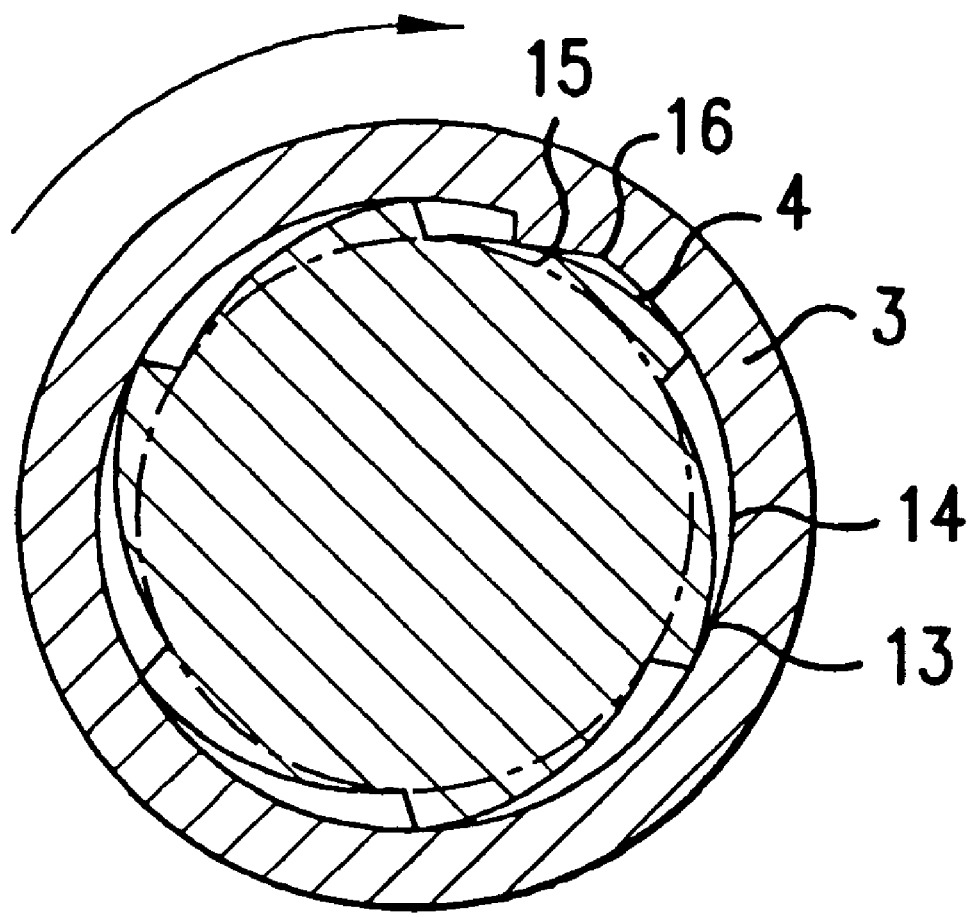
FIG. 6 is a cross-sectional view similar to FIG. 2 illustrating an embodiment having six wedges.

For reasons of clarity, FIG. 2 shows profiles 11, 12 with only three wedges 13 and 15. In order to permit a more precise compensation of eccentricities or unbalanced masses, the profiles 11, 12 are advantageously provided with more than three, preferably with six wedges (FIG. 6) which permit an inserting of the clamping chuck in positions swivelled by 60° respectively.

The clamping chuck 4 is inserted with a "lead" in the sense that its marking 18 during the counterclockwise rotation can move in the direction of the marking 17 on the receiving device 3. In this case, the joining gap is first eliminated and then the frictional engagement is achieved with such a high contact pressure that the machining torque can be absorbed. In this frictional engagement, the clamping chuck 4 can then be rotated still farther until the markings 17, 18 are situated approximately opposite one another. As a rule, a rotating angle of up to 30° is available for this rotation so that the markings 17, 18 and therefore the eccentricities or unbalanced masses to be compensated can be adjusted to be opposite one another up to an angular deviation of ±15°.

Figure 4:
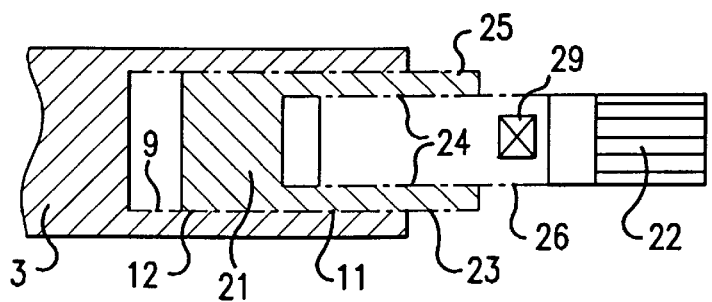
FIG. 4 is a longitudinal sectional view of the receiving device of a tool constructed according to another preferred embodiment of the invention.

In the same manner as with respect to the above-described clamping chuck 4, according to FIG. 4, a clamping sleeve 21 for the holding of a tool, such as a milling tool 22, can also be inserted into the holding device 3 of the spindle 1. For this purpose, the clamping sleeve 21 has on its essentially cylindrical holding surface 23, the profile 11 adapted to the profile 12 of the holding device 3.

According to the invention, the clamping sleeve 21 has a profile 25 of the described type for the holding of the tool 22 provided with an adapted profile 26 also in its centric receiving device 24 for the tool 22. These profiles 25/26 facilitate and accelerate only the exchange of tools in the clamping sleeve and ensure a largely centric receiving of the latter in the clamping sleeve 21 as well as in the receiving device 3 of the spindle 3; by means of these profiles—as described above for the clamping chuck/holding device pairing of the spindle—, eccentricities or imbalances between the clamping sleeve and the tool can also be reduced.

The inserting and removing of the clamping sleeve 21 into and from the holding device 3 of the spindle and of the tool 22 into and from the clamping sleeve takes place as described with respect to the clamping chuck 4. In the same manner, a tool 22 can removed from the clamping sleeve 21 in the case of wear or damage and can be replaced by another tool. The tools 22 are advantageously provided with key faces 29 to which tools can be applied for the exchange.

Figure 5:
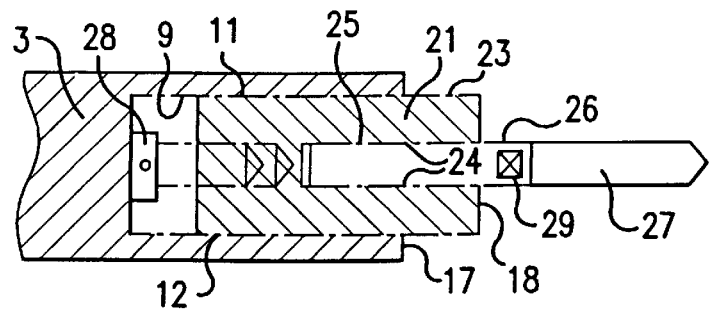
FIG. 5 is a longitudinal sectional view of yet another embodiment of the invention for receiving a tool.

In the embodiment of FIG. 5, the tool is a drill 27 which, during the machining, must transmit not only torque but also shearing force in the drilling direction. So that it can securely transmit this shearing force to the clamping sleeve 21, the receiving bore 24 of the clamping sleeve is constructed as a pocket bore on the bottom of which the drill rests with the end of its shaft. The clamping sleeve 21 is also supported by means of an adjusting screw 28 on the rear wall of the bore of the holding device 3 of the spindle 1. By means of this adjusting screw 28, the drilling depth of the drill 27 can be adjusted. Naturally this adjustment can also be achieved by placing spacer pieces between the face of the clamping sleeve 21 and the bottom of the bore of the holding device 3.

Particularly during the holding of tools, such as milling tools 22 according to FIG. 4 which, during the machining, must transmit no significant shearing forces, the holding force is as a rule sufficient which is generated by the frictional engagement in the profile pairings 11/12 and 25/26. At least, no special measures are required here with respect to the securing against an axial displacement. However, in most other cases, the frictional engagement can also be selected to be so high that by way of the profile pairings 11/12 and 25/26 alone, sufficient shearing and tensile forces can also be transmitted.

Thus, in the embodiment of FIG. 4, for adjusting the position of the tool 22 in the axial direction, the clamping sleeve 21 is pushed correspondingly deeply into the holding device 3 of the spindle 1 and is fastened by the mutual rotating of the clamping sleeve and the holding device. In the axial direction, the profile surfaces are advantageously so wide that also, in the case of the lowest provided insertion depth, a sufficiently high frictional engagement is achieved for transmitting the required torques and forces.

In some cases, it may be advantageous to let the wedges extend in a steeply helical manner. This can achieve that a force resulting from a circumferential force and from a shearing force acts in the axial direction approximately in the slope direction of the wedge surfaces.

The direction of the slope of the wedges 13 and 15 is advantageously selected in both profile pairings 11/12 and 25/26 such that the tightening of the profile pairings takes place in that rotational direction in which during the operation the torque is transmitted. However, the frictional engagement can easily be selected to be so high that also in the opposite rotating direction a holding moment will exist which exceeds to operating torque to be generated; a tool can therefore be inserted in both rotating directions.

The amount of the frictional engagement can be determined by the slope of the wedges 13 and 15, by their width, by the material pairing of the interacting profiles and by the tightening torque. The slope of the wedges 13, 15 is advantageously between 1:50 and 1:500. Larger slopes are assigned to smaller diameters, for example, that of the drill 27; smaller slopes, in contrast, are assigned to larger diameters. As the result of the arrangement of the three wedges 13, 15 preferably with the same spacing along the circumference, an advantageous centering effect is achieved; however, as mentioned above, different numbers of wedges on the circumference are also contemplated.

The wedge-shaped profiles 11, 12 and 25, 26 in the holding device 3 and on the clamping chuck 4 or the clamping sleeve 21 and on a tool 22, 27 can be produced, for example, by grinding. The surfaces of the wedges 13, 15 may be cylindrical.

However, advantageously, they follow a logarithmic spiral because, in this case, the whole surfaces rest against one another with the same contact pressure and, as a result, an optimal frictional engagement and an optimal centering are achieved also in the case of a one-sided load.

It is understood that the holding of the clamping chuck 4 or of the clamping sleeve 21 is possible also in a kinematic reversal of the illustrated embodiment in that the holding device 3 carries the profile 12 on its outer circumference and the clamping chuck 4 or the clamping sleeve 21 carries the profile 11 in a bore.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for the centric and/or imbalance-free holding of rotating parts, such as a clamping chuck for a workpiece, or a clamping sleeve for a cool, or a tool on a spindle of a turning machine by means of centric holding surfaces, wherein device holding surfaces are provided with profiles which are coordinated with one another in pairs and which each have three or six wedges which rise over imaginary cylindrical reference surfaces radially toward the outside or toward the inside and each again drop steeply back to the reference surfaces, are offset by the same angles in the circumferential direction and have a joining gap in a joining position, wherein the surface of the wedges follow the course of a logarithmic spiral, so that the surfaces of the wedges fit flatly against one another in all angular positions thereby effecting a precisely centered fit in the holding device, further wherein angular positions of eccentricities or unbalanced masses of two respective parts to be connected which are known with respect to a starting position, are joined in such a mutual angular position and rotated into frictional engagement such that the eccentricities or unbalanced masses are substantially diametrically opposite with respect to the axis of rotation of the spindle, so that said eccentricities or unbalanced masses are optimally compensated.

2. Holding device according to claim 1, wherein the slope of the wedges is between 1:50 and 1:500.

3. Holding device according to claim 1, wherein a rising direction of the wedges of the profile pairings is such that, during the machining of a workpiece, they endeavor to slide up on one another.

* * * * *